US009807795B2

(12) United States Patent
Jeong et al.

(10) Patent No.: US 9,807,795 B2
(45) Date of Patent: Oct. 31, 2017

(54) METHOD AND DEVICE FOR REVERSE TRANSMISSION IN A MOBILE COMMUNICATION SYSTEM

(75) Inventors: Kyeong In Jeong, Suwon-si (KR); Soeng Hun Kim, Yongin-si (KR); Gert Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/638,301

(22) PCT Filed: Apr. 5, 2011

(86) PCT No.: PCT/KR2011/002352
§ 371 (c)(1),
(2), (4) Date: Sep. 28, 2012

(87) PCT Pub. No.: WO2011/126261
PCT Pub. Date: Oct. 13, 2011

(65) Prior Publication Data
US 2013/0016689 A1    Jan. 17, 2013

(30) Foreign Application Priority Data
Apr. 6, 2010 (KR) .................. 10-2010-0031342

(51) Int. Cl.
*H04W 74/02* (2009.01)
*H04W 74/00* (2009.01)
*H04W 74/08* (2009.01)

(52) U.S. Cl.
CPC .......... *H04W 74/02* (2013.01); *H04W 74/006* (2013.01); *H04W 74/0808* (2013.01)

(58) Field of Classification Search
CPC .............. H04W 74/02; H04W 74/006; H04W 74/0808
See application file for complete search history.

(56) References Cited

U.S. PATENT DOCUMENTS

| 2009/0092086 A1 | 4/2009 | Lee et al. |
| 2010/0074204 A1* | 3/2010 | Meylan ................. 370/329 |
| 2011/0039568 A1 | 2/2011 | Zhang et al. |
| 2011/0292895 A1* | 12/2011 | Wager et al. ........... 370/329 |
| 2012/0044816 A1 | 2/2012 | Ratasuk et al. |

(Continued)

FOREIGN PATENT DOCUMENTS

| EP | 2530994 A1 | 12/2012 |
| KR | 10-2009-0116238 A | 11/2009 |

(Continued)

OTHER PUBLICATIONS

Wu, D. et al., "Packet Size Optimization for Goodput Enhancement of Multi-Rate Wireless Networks," 2007.WCNC. IEEE , Mar. 11-15, 2007, pp. 3578-3583.

(Continued)

*Primary Examiner* — Walter Divito
(74) *Attorney, Agent, or Firm* — Jefferson IP Law, LLP

(57) ABSTRACT

The present invention defines an efficient contention-based access procedure in a mobile communication system. The present invention is directed to a 3GPP LTE/LTE-A mobile communication system under discussion in the 3GPP as one of the representative next generation mobile communication system.

10 Claims, 11 Drawing Sheets

(56) References Cited

U.S. PATENT DOCUMENTS

2012/0307767 A1 12/2012 Yamada et al.
2012/0314619 A1 12/2012 Wiberg et al.

FOREIGN PATENT DOCUMENTS

| WO | 2007/078177 A1 | 7/2007 |
| WO | 2010/033618 A2 | 3/2010 |
| WO | 2011-019813 A2 | 2/2011 |
| WO | 2011-102764 A1 | 8/2011 |
| WO | 2012-024040 A1 | 2/2012 |

OTHER PUBLICATIONS

Jun Yin et al., "Optimal packet size in error-prone channel for IEEE 802.11 distributed coordination function," 2004. WCNC. 2004 IEEE, vol. 3, vol. 3, Mar. 21-25, 2004, pp. 1654-1659.
Lettieri, P. et al., "Adaptive frame length control for improving wireless link throughput, range, and energy efficiency," INFOCOM '98. IEEE, vol. 2, Mar. 29-Apr. 2, 1998, pp. 564-571.
Ericsson, Contention Based Uplink Transmissions, 3GPP TSG-RAN WG2 #66bis,R2-093812, Jun. 29, 2009, Los Angeles, USA.
Samsung, Contention Based Access for Rlc T/UM Data, 3GPP TSG-RAN2#69bis meeting, R2-102463, 12 Apr. 2010, Beijing, China.

* cited by examiner (RELATED ART)

(RELATED ART)

(RELATED ART)

(RELATED ART)

METHOD AND DEVICE FOR REVERSE TRANSMISSION IN A MOBILE COMMUNICATION SYSTEM

BACKGROUND OF THE INVENTION

Field of the Invention

The present invention relates to a mobile communication method in a mobile communication system and, in particular, to an efficient contention-based uplink transmission method in a mobile communication system.

Description of the Related Art

Mobile communication systems have developed to provide the subscribers with voice communication services on the move. With the advance of technologies, the mobile communications have been evolved to support high speed data communication services as well as the standard voice communication services.

Recently, as one of the next generation mobile communication system, Long Term Evolution (LTE) is on the standardization by the 3$^{rd}$ Generation Partnership Project (3GPP). LTE is a technology designed to provide high speed packet-based communication of up to 100 Mbps and standardized almost completely now with the aim at commercial deployment around 2010 timeframe. As the LTE standard is on the verge of ratification, discussion is focused on LTE-advanced (LTE-A) with the adoption of various novel techniques to LTE. One of the newly adopted techniques is contention-based access. Since the uplink transmission is performed using the dedicated transmission resource allocated by the base station, it is typical that there is no collision. In order to allocate the dedicated uplink resource, however, the terminal has to request the base station to allocate transmission resource and this procedure causes transmission delay. In order to solve this problem, the base station is capable of allocating a part of the transmission resource as contention-based access resource. The transmission resource indicated as the contention-based access resource can be commonly used by the terminal intending to transmit data.

FIG. 1 is a diagram illustrating the architecture of an LTE or LTE-A system.

Referring to FIG. 1, the radio access network of an LTE/LTE-A system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130. The eNBs 105, 110, 115, and 120 correspond to legacy node Bs of Universal Mobile Communications System (UMTS). The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology on up to 20 MHz bandwidth. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

FIG. 2 is a diagram illustrating a protocol stack of the 3GPP LTE/LTE-A system.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. ARQ is the technique for checking whether the packet transmitted by the transmitted is received by the received successfully and retransmitting the packets received erroneously. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. With the reference to transmission, the data input to the protocol entity is referred to as SDU (Service Data Unit), and the data output by the protocol entity is referred to as PDU (Protocol Data Unit).

FIG. 3 is a diagram illustrating a normal uplink transmission operation.

Referring to FIG. 3, if a predetermined condition such as transmission data occurrence is fulfilled, the UE 305 transmits a scheduling request to the eNB 310 to request for transmission resource allocation at step 315. When it becomes necessary to transmit the scheduling request, this is expressed that the scheduling request is triggered, and the terms 'scheduling request' and SR are used interchangeably. The scheduling request can be categorized into one of Dedicated Scheduling Request 9D-SR) and Random Access Scheduling Request (RA-SR). The D-SR is the scheduling request transmitted through the dedicated transmission resource allocated to the UE. The transmission resource for the D-SR is the dedicated transmission resource arriving periodically and capable of transmitting 1-bit information. The UE allocated the transmission resource for D-SR is capable of transmitting D-SR, if necessary. It may not possible to allocate the transmission resource for D-SR to all UEs, and the UE allocated no transmission resource for D-SR notifies the eNB of the presence of data to be transmitted and this is expressed that RA-SR is transmitted.

Upon receipt of the scheduling request signal, the eNB allocates uplink transmission resource to the UE. The information for use in allocation of uplink transmission resource is referred to as uplink grant, and the uplink grant is transmitted to the UE through Physical Downlink Control Channel (PDCCH) at step 320. The uplink grant is addressed to the terminal with Cell-Radio Network Temporary Identity as a UE identifier. The uplink grant includes the information on the transmission resource for the uplink transmission of the UE and MCS to be applied to the uplink transmission and the information necessary for HARQ operation such that the UE performs uplink transmission at a time point after elapse of a predetermine duration since the receipt of the uplink grant. As far as the terminal has data to be transmitted, the eNB is capable of transmitting the uplink grant to the UE continuously.

FIG. 4 is a diagram illustrating a normal contention-based access operation.

Referring to FIG. 4, the eNB 410 determines to allocate contention-based transmission resource at a certain time point at step 415. This time point may be the timing when the transmission remained without being allocated to the UE due to low traffic of the cell, as example. Since the contention-based access resource is the transmission resource allocated to unspecific UEs, the allocation is performed with a separate identifier pre-indicated (or notified to the UEs in the connected state individually) rather than C-RNTI as a unique UE ID. This identifier is referred to as CB-RNTI (Contention Based-Radio Network Temporary Identity). The eNB transmits the uplink grant addressed to the CB-RNTI at step 420. Hereinafter, the terms 'uplink grant addressed to CB-RNTI' and 'contention-based uplink grant' are used interchangeably with each other. Upon receipt of the contention-based uplink grant, if there is the data to be transmitted (425), the UE transmits the data based on the contention-based uplink grant at step 430.

DISCLOSURE OF INVENTION

Technical Problem

If the number of the UEs having the data to be transmitted in the contention-based access mode and received the contention-based uplink grant is equal to or greater than 1, the collision of uplink transmissions is likely to occur at step 430 of FIG. 4, resulting in increase of transmission delay or transmission failure probabilities. There is therefore a need of an efficient contention-based access operation that is capable of minimizing transmission delay or transmission failure probability caused by collision. The present invention proposes a method for minimizing the influence of the collision occurring in transmission using the contention-based uplink transmission resource. Since, if a large RLC SDU is segmented into several RLC PDUs to be transmitted, the transmission delay and failure probability caused by collision increases in proportion to the number of the segmented PDUs, the UE is capable of transmitting data/control information through the contention-based transmission resource only when the segmentation can be avoided.

Solution to Problem

In order to solve the above problem, an uplink transmission method in a mobile communication system according to the present invention, includes determining, when uplink data occurs, whether to use a received contention-based uplink grant based on a size of the uplink data; and transmitting, when determined to use the contention-based uplink grant, the uplink data through a transmission resource indicated by the received contention-based uplink grant.

In order to solve the above problem, an uplink reception method in a mobile communication system includes transmitting a contention-based uplink grant to a terminal; and receiving an uplink data from the terminal through a transmission resource indicated by the contention-based uplink grant; wherein the terminal determines, when the uplink data occurs, whether to use the contention-based uplink grant based on a size of the uplink data; and transmits, when determined to use the contention-based uplink grant, the uplink data through the transmission resource indicated by the received contention-based uplink grant.

In order to solve the above problem, an uplink transmission apparatus in a mobile communication system according to the present invention includes a determiner which determines, when uplink data occurs, whether to use a received contention-based uplink grant based on a size of the uplink data; and a controller which transmits, when determined to use the contention-based uplink grant, the uplink data through a transmission resource indicated by the received contention-based uplink grant.

In order to solve the above problem, an uplink reception apparatus in a mobile communication system according to the present invention includes a scheduler which determines contention-based uplink transmission resource; a transmitter which transmits a contention-based uplink grant indicating the contention-based uplink transmission resource to a terminal; and a receiver which receives uplink data from the terminal through the contention-based uplink transmission resource, wherein the terminal determines, when the uplink data occurs, whether to use the contention-based uplink grant based on a size of the uplink data; and transmits, when determined to use the contention-based uplink grant, the uplink data through the transmission resource indicated by the received contention-based uplink grant.

Advantageous Effects

According to the present invention, it is possible to minimize the influence of collision in the transmission using the contention-based uplink transmission resource in the mobile communication system. That is, the present invention is capable of minimizing the transmission delay or transmission failure caused by collision in the mobile communication system.

DETAILED DESCRIPTION OF EXEMPLARY EMBODIMENTS

Figure 1:
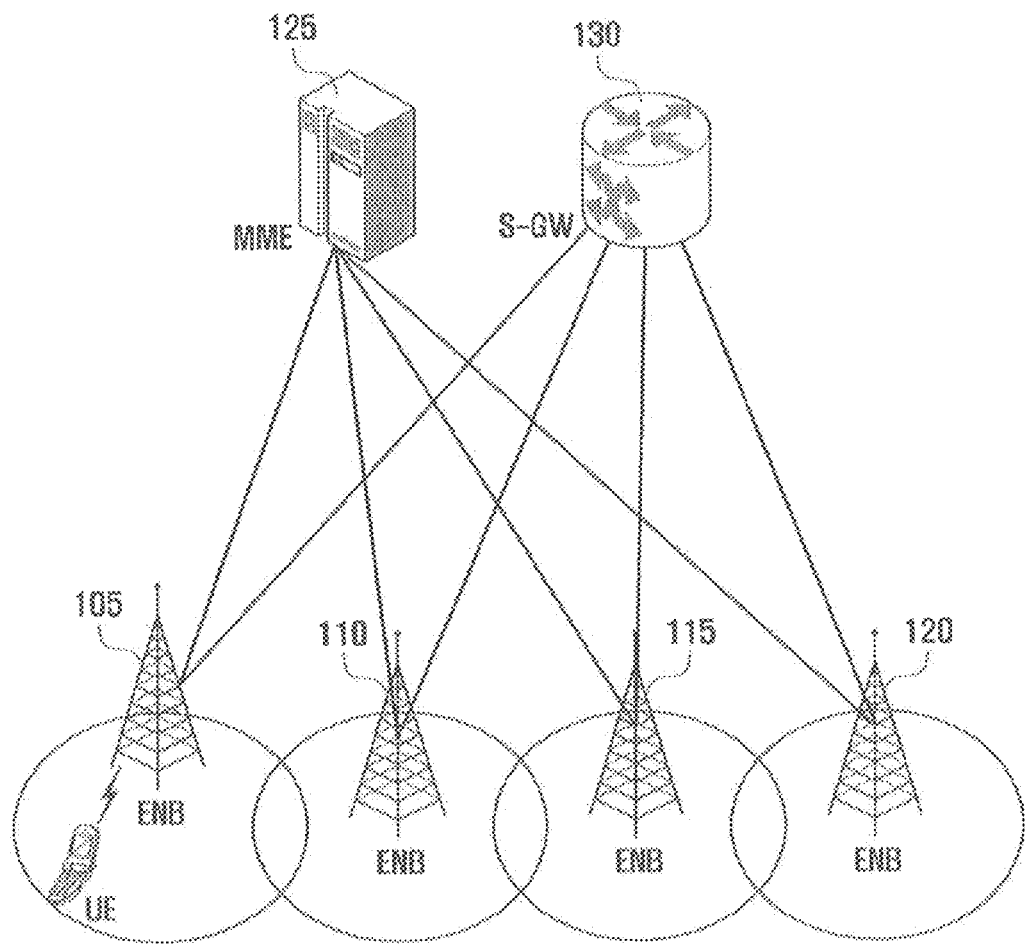
FIG. 1 is a diagram illustrating the architecture of an LTE or LTE-A system.
Figure 2:
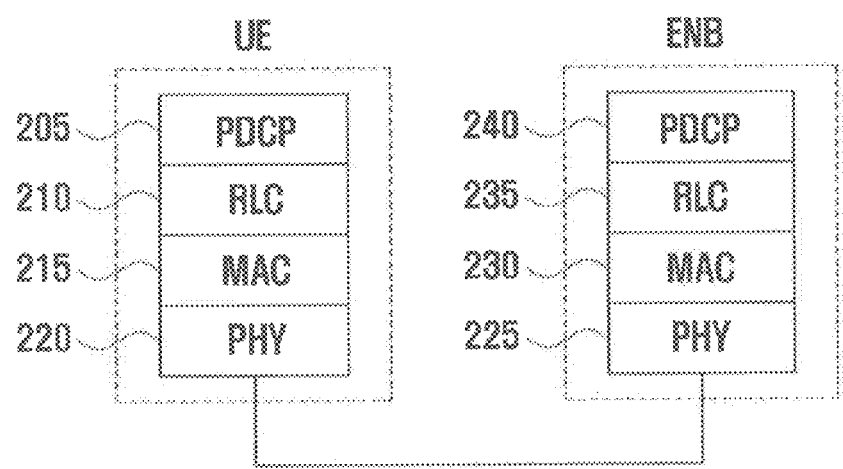
FIG. 2 is a diagram illustrating a protocol stack of the 3GPP LTE/LTE-A system.
Figure 3:
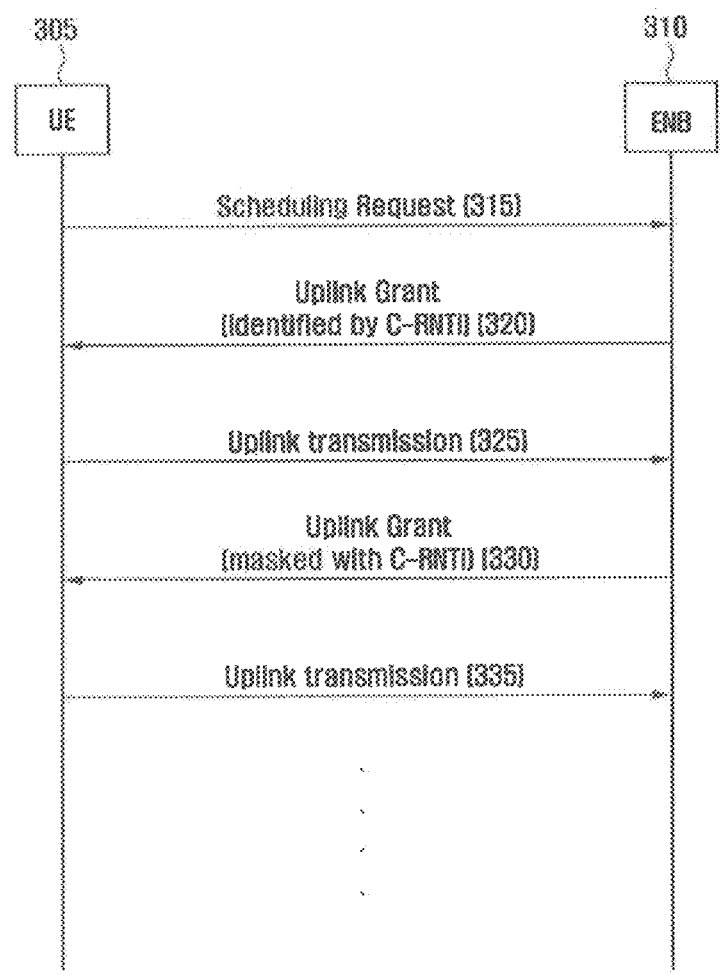
FIG. 3 is a diagram illustrating a normal uplink transmission operation.
Figure 4:
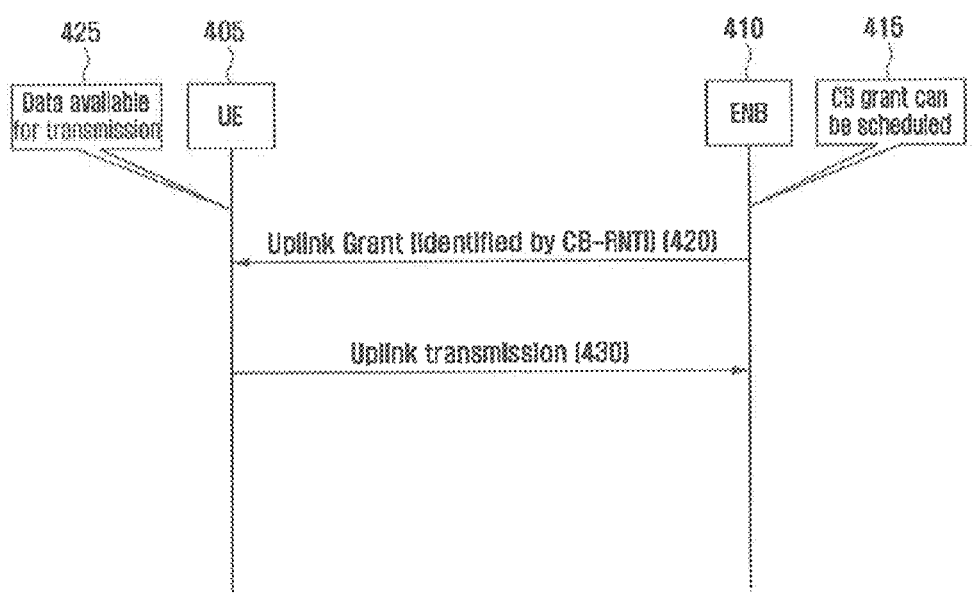
FIG. 4 is a diagram illustrating a normal contention-based access operation.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In the mobile communication system according to the present invention, if uplink data occurs, the UE determines whether to use contention-based uplink grant received from the eNB depending on the size of the uplink data. At this time, the UE is capable of determining whether to use the contention-based uplink grant before the reception of the contention-based uplink grant from the eNB or after the reception of the contention-based uplink grant from the eNB. In the case of using the contention-based uplink grant, the UE transmit the uplink data to the eNB through the contention-based uplink transmission resource indicated in in the contention-based uplink grant.

In an embodiment of the present invention, the UE compares the size of the uplink data with a predetermined threshold to determine whether to use the contention-based uplink grant. That is, if the size of the RLC SDU carrying the uplink data is less than a specific size, the UE performs uplink transmission using the contention-based uplink grant. Otherwise, if the size of the RLC SDU is equal to or greater than the specific size, the UE performs uplink transmission using the conventional D-SR transmission resource or RA-SR transmission resource rather than the contention-based uplink transmission. The specific size of the RLC SDU can be broadcast in the system information of the eNB or transmitted in UE-specific message, or hard-coded as a standard value. The above embodiment may be applied limitedly to a specific logical channel.

In another embodiment of the present invention, the UE determines whether to segment the uplink data in adaptation to the contention-based uplink transmission resource indicated in the contention-based uplink grant to determine whether to use the contention-based uplink grant. That is, if it is not necessary to segment the RLC SDU(s) to be transmitted in uplink even with the use of the received contention-based uplink grant, the UE performs uplink transmission using the contention-based uplink grant. Otherwise, if it is necessary to segment the RLC SDU(s) to be transmitted in uplink with the use of the received contention-based uplink grant, the UE ignores the received contention-based uplink grant and waits for the next contention-based uplink grant or performs uplink transmission using the conventional D-SR transmission resource or RA-SR transmission resource. The eNB broadcasts an indicator on whether to apply the above operation to the contention-based access in the system information or transmits the indicator in a UE-specific message or the UE may apply the above operation to the contention-based access without indicator.

Although the description is directed to the case where the UE receives the contention-based uplink transmission resource information in the contention-based uplink grant transmitted on a L1 control channel, in the case of assuming that, when the contention-based uplink transmission resource information is broadcast as system information or signaled in the UE-specific higher layer (Radio Resource Control: RRC) message, the uplink transmission is performed based on the contention-based uplink transmission resource information broadcasted or signaled in the UE-specific higher layer message, the UE may determine whether to segment the RLC SDU. In this case, if the RLC SDU segmentation occurs, the UE performs, other than the contention-based access, the uplink transmission using the conventional D-SR transmission resource or the RA-SR transmission resource and does not need to receive the contention-based uplink grant transmitted on the L1 control channel. The above embodiment may be restricted to a specific control channel.

According to another embodiment of the present invention, the UE determines whether the RLC transmission buffer 1051 is emptied in the case where the uplink data is transmitted through the contention-based uplink transmission resource indicated in the contention-based uplink grant to determine whether to use the contention-based uplink grant. If it is determined that the uplink transmission buffer is emptied in the case of using the received contention-based uplink grant, the UE transmits the data/control information using the contention-based uplink grant. Otherwise, if it is determined that the uplink transmission buffer is not emptied in the case of using the received contention-based uplink grant, the UE ignores the received contention-based uplink grant and waits for receiving the next contention-based uplink grant or performs uplink transmission using the conventional D-SR transmission resource or RA-SR transmission. The eNB is capable of broadcasting the indicator on whether to apply the above operation to the contention-based access or transmitting the indicator in a UE-specific message, or the UE is capable of applying the above operation to the contention-base access always without referencing the indicator.

Although the description is directed to the case where the UE receives the contention-based uplink transmission resource information in the contention-based uplink grant transmitted on a L1 control channel, in the case of assuming that, when the contention-based uplink transmission resource information is broadcast as system information or signaled in the UE-specific higher layer (Radio Resource Control: RRC) message, the uplink transmission is performed based on the contention-based uplink transmission resource information broadcasted or signaled in the UE-specific higher layer message, the UE may determine whether the transmission buffer is to be emptied. In this case, if the transmission buffer is not to be emptied, the UE performs uplink transmission using the conventional D-SR transmission resource or RA-SR transmission resource, rather than performs the contention-based access, and does not need to receive the contention-based uplink grant transmitted on the L1 control channel. The above embodiment may be applied limitedly to a specific logical channel.

Figure 5:
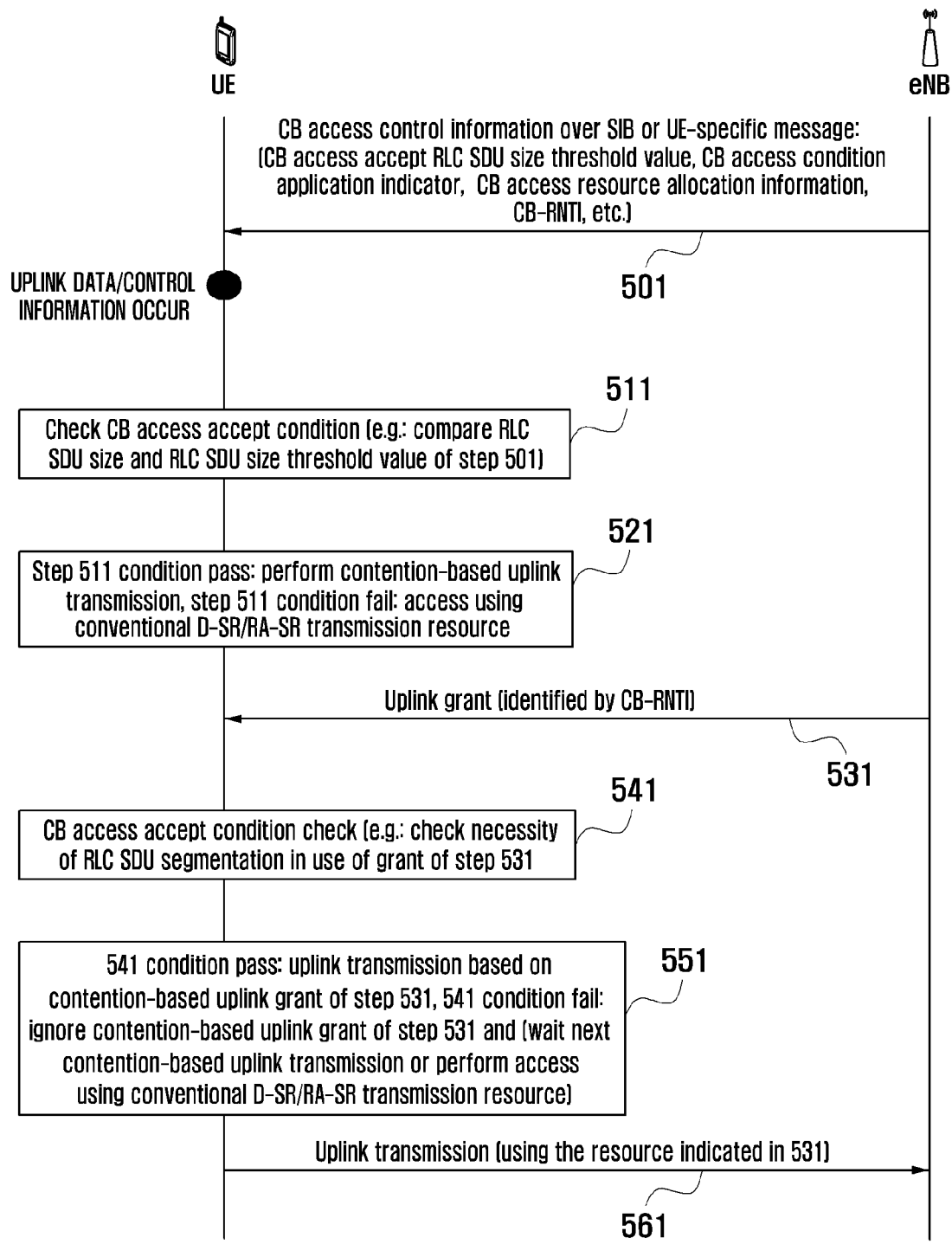
FIG. 5 is a signaling diagram illustrating the contention-based access according to an embodiment of the present invention.

FIG. 5 is a signaling diagram illustrating the contention-based access according to an embodiment of the present invention.

Referring to FIG. 5, the eNB is capable of broadcasting the contention-based (hereinafter, used interchangeably with CB) access control information in the System Information Block (SIB) within the cell or transmitting the control information through UE-specific message at step 501. The contention-based access control information includes the information about the condition to allow for the contention-based access, and the condition information includes the threshold value of the RLC SDU size (e.g. instruct the UE to perform the contention-based uplink access only when the uplink transmission RLC SDU size is less than the threshold value) or the indicator on whether to apply the operation of checking the condition upon receipt of the contention-based uplink grant (e.g. in the case of performing uplink transmission using the received contention-based uplink grant, the UE performs the uplink transmission using the contention-based uplink grant only when the RLC SDU segmentation does not occurs or only when the transmission buffer is emptied. The contention-based access control information is also capable of including the contention-based uplink transmission resource information and CB-RNTI value. The contention-based uplink transmission resource information may be transmitted in the contention-based uplink grant addressed to the CB-RNTI on the L1 control channel or in the message transmitted at step 501 semi-statically per cell. The contention-based uplink transmission resource information transmitted at step 501 may include the number of Physical Resource Blocks, MCS (Modulation and Coding Scheme) level information, coding rate information, etc.

At step 501, it is assumed that the information on whether to apply the condition and the related control information are signaled by the eNB explicitly. If the RLC SDU size threshold value to be applied to the contention-based access is hardcoded as a standard value or if the UE always perform the operation of checking the condition on whether to use the grant when the contention-based uplink grant is received, it is not necessary for the eNB to transmit the related information.

If the data/control information to be transmitted in uplink occurs after receiving the message transmitted at step 501, the UE checks at step 511 whether to apply the contention-based uplink transmission based on the information received at step 501. For example, if the message received at step 501 includes the information on the RLC SDU size threshold that can be applied to the contention-based access, the UE compares the uplink RLC SDU size with the RLC SDU size threshold value and, if the uplink RLC SDU size is (equal to) or less than the RLC SDU size threshold value, is capable of transmitting RLC SDU using the contention-based uplink transmission resource. In this case, the UE receives the contention-based uplink grant addressed to the CB-RNTI on the L1 control channel. Otherwise if the uplink RLC SDU size is (equal to) or greater than the RLC SDU size threshold value, the UE perform uplink transmission using the conventional D-SR or RA-SR transmission resource.

In another example, if the condition application indication information is configured to apply the condition for performing the uplink transmission unit the contention-based uplink transmission resource only when the RLC SDU segmentation occurs in the message received at step 501 and if contention-based uplink transmission resource information is included in the message received at step 501, the UE perform uplink transmission unit the contention-based uplink transmission resource only when the RLC SDU segmentation does not occurs under the condition of performing the uplink transmission based on the contention-based uplink transmission resource that is included in the message received at step 501. In this case, the contention-based uplink grant addressed to the CB-RNTI is received on the L1 control channel. Otherwise, if it is assumed to perform uplink transmission based on the contention-based uplink transmission resource information, the UE performs uplink transmission using the conventional D-SR or RA-SR resource rather than contention-based uplink transmission resource at step 521.

In another embodiment, if the condition application indication information is configured to apply the condition for performing the uplink transmission using the contention-based uplink transmission resource only when the transmission buffer can be emptied by transmitting the RLC PDU to the UE in the message received at step 501 and if the contention-based uplink transmission resource information is not included in the message received at step 501, the UE perform uplink transmission using the contention-based uplink transmission resource only when the transmission buffer can be emptied under the assumption of the uplink transmission based on the contention-based uplink transmission resource information included in the message received at step 501. In this case, the contention-based uplink grant addressed to the CB-RNTI is received on the L1 control channel. Otherwise, if it is assumed to perform the uplink transmission based on the contention-based uplink transmission resource information, the UE performs uplink transmission unit the conventional D-SR or RA-SR transmission resource rather than the contention-based uplink transmission resource at step 521.

If it is determined to perform the uplink transmission using the contention-based uplink transmission resource at steps 511 and 521, the UE receives the contention-based uplink grant information addressed to the CB-RNTI transmitted on the L1 control channel at step 531. In addition to checking the condition for performing contention based uplink transmission at step 511 and 521, the UE is capable of performing the operation following step 531. That is, if the condition for performing the contention-based uplink transmission is applied at step 511 and 521, the operation following steps 511 and 521 can be performed along with; and although the condition for performing the contention-based uplink transmission is not applied at steps 511 and 521, the operation following steps 531 can be performed. If the contention-based uplink grant is received at step 531, the UE checks at step 541 whether to perform the uplink transmission using the transmission resource indicated in the grant carried in the contention-based uplink grant received at step 321 based on the information received at step 501. For example, if the condition application indication information is configured to apply the condition for perform uplink transmission using the contention-based uplink transmission resource only when the RLC PDU segmentation occurs at step 501, the UE performs, at steps 551 and 561, the uplink transmission using the transmission resource included in the uplink grant received at step 531 only when the RLC SDU segmentation occurs under the assumption of the uplink transmission based on the contention-based uplink grant received at step 531. Otherwise, if it is assumed to perform the uplink transmission based on the contention-based uplink grant at step 531 and if RLC SDU segmentation occurs, the UE ignores the contention-based uplink grant received at step 531 and waits for the next contention-based uplink grant or performs uplink transmission using the conventional D-SR transmission resource or RA-SR transmission resource at step 551.

In another embodiment, if the condition application indication information is configured to apply the condition for performing uplink transmission using the contention-based uplink transmission resource only when the transmission buffer is emptied by transmitting the RLC PDU at step 501, the UE performs uplink transmission, at steps 551 and 561, using the transmission resource indicated in the uplink grant received at step 531 only when the transmission buffer can be emptied under the assumption of uplink transmission based on the contention-based uplink grant received at step 531. Otherwise, if it is assumed to performed uplink transmission based on the contention-based uplink grant received at step 531 and if the transmission buffer cannot be emptied, the UE ignores the contention-based uplink grant received at step 531 and waits for receiving the next contention-based uplink grant or performs uplink transmission using the conventional D-SR transmission resource or RA-SR transmission resource at step 551.

The embodiment of FIG. 5 may be applied limitedly to a specific logical channel. In this case, the information on the specific logical channel may be signaled at step 501 or hardcoded as a standard.

Figure 6:
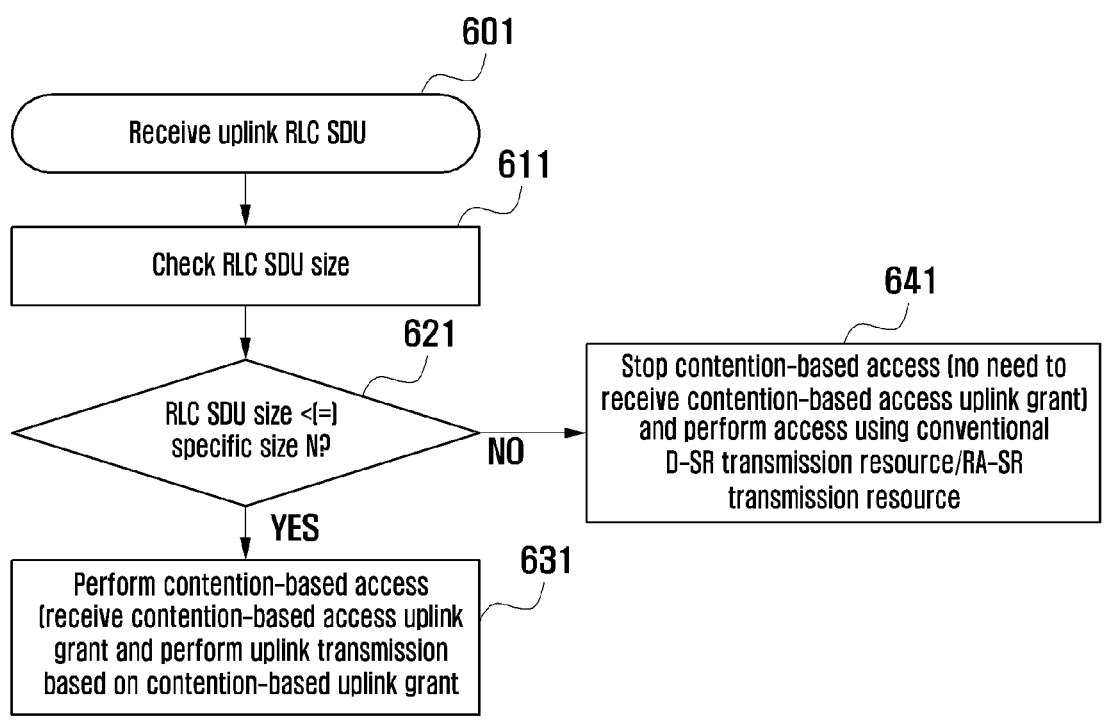
FIG. 6 is a flowchart illustrating the UE operation for contention-based access according to an embodiment of the present invention.

FIG. 6 is a flowchart illustrating the UE operation for contention-based access according to an embodiment of the present invention.

Referring to FIG. 6, if an RLC SDU to be transmitted in uplink is generated at the higher layer of the UE (i.e. if uplink data/control information occurs) at step 601, the UE compares the RLC SDU size with a RLC SDU size threshold value N hardcoded as a standard or received in the system information or the UE-specific message at steps 611 and 621. If the RLC SDU size is (equal to or) less than the RLC SDU size threshold value N, the UE is capable of transmitting the RLC SDU using the contention-based uplink transmission resource at step 631. In this case, the UE receives the contention-based uplink grant addressed to CB-RNTI and performs uplink transmission using the contention-based uplink transmission resource indicated in the grant. Otherwise, if the RLC SDU size is (equal to or) greater than the RLC SDU size threshold value N, the UE stops contention-based uplink access and performs uplink transmission using the conventional D-SR or RA-SR transmission resource at step 641. In this case, it is not necessary to receive the contention-based uplink grant addressed to the CB-RNTI on the L1 control channel.

Figure 7:
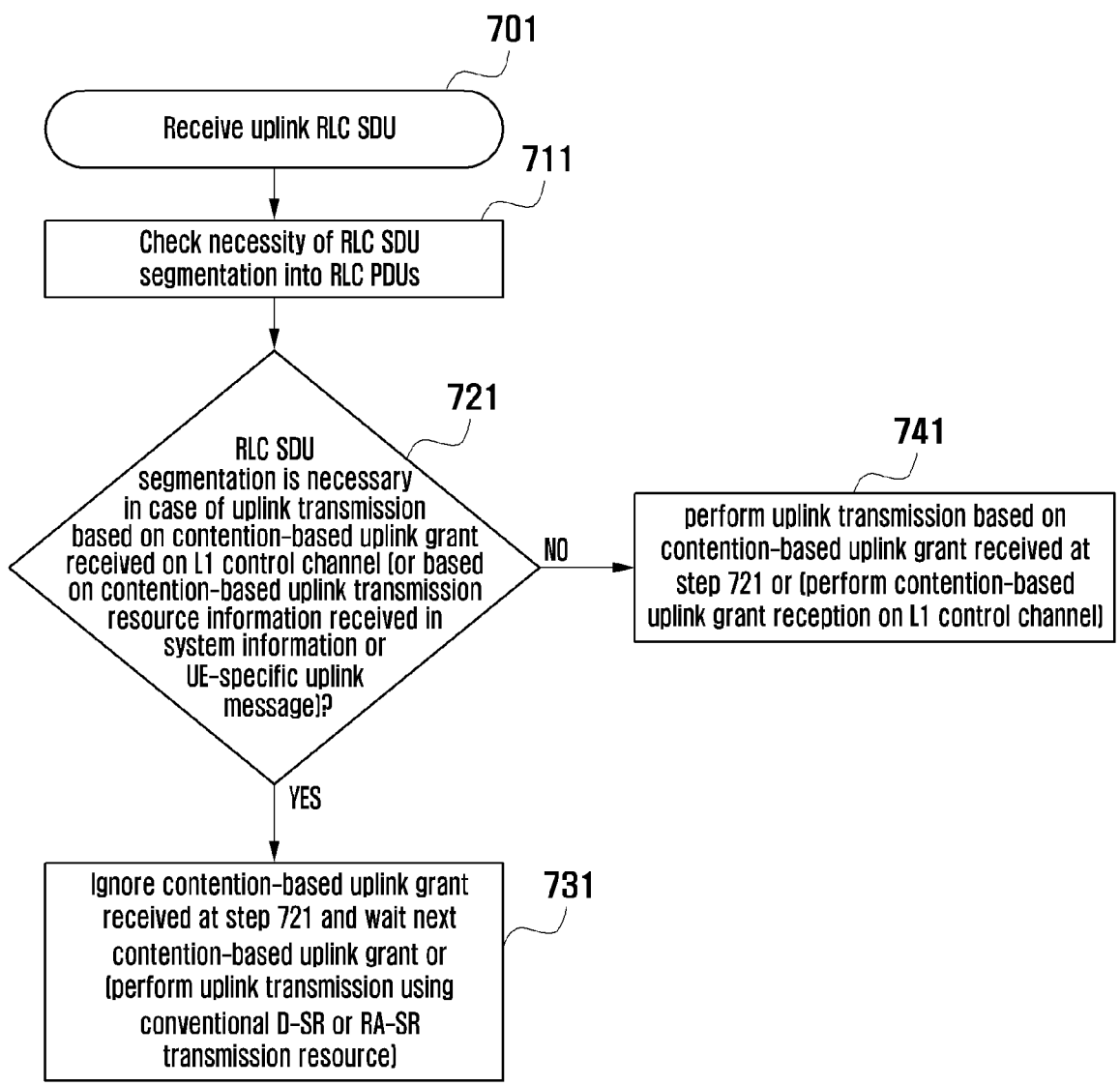
FIG. 7 is a flowchart illustrating the UE operation for the contention-based access according to an embodiment of the present invention.

FIG. 7 is a flowchart illustrating the UE operation for the contention-based access according to an embodiment of the present invention.

Referring to FIG. 7, if an RLC SDU to be transmitted in uplink is generated at the higher layer (i.e., if the uplink data/control information occurs) at step 701, the UE checks whether the RLC SDU has to be segmented into plural RLC PDUs to be transmitted using the contention-based uplink transmission resource at step 711. If the RLC SDU segmentation is required to perform uplink transmission based on the contention-based uplink grant received on the L1 control channel, the UE ignores the received contention-based uplink grant and waits for the next contention-based uplink grant or performs uplink transmission using the conventional D-SR transmission resource or RA-SR transmission resource at steps 721 and 731. Otherwise, if it is determined to perform the uplink transmission based on the contention-based uplink grant received through the L1 control channel and if it is not required to segment the RLC SDU, the UE performs uplink transmission based on the received contention-based uplink grant at step 721 and 741.

If the contention-based uplink transmission resource information is received in the system information or UE-specific higher layer message, the UE checks whether the RLC segmentation is required under the assumption of uplink transmission based on the contention-base uplink transmission resource information and, if the RLC SDU segmentation is required, performs uplink transmission using the conventional D-SR or RA-SR transmission resource rather than the contention-based uplink transmission resource at step 721 and 731. In this case, it is not necessary to receive the contention-based uplink grant addressed to the CB-RNTI. Otherwise, if the RLC SDU segmentation is not required, the UE receives the contention-based uplink grant addressed to the CB-RNTI through the L1 control channel at step 721 and 741.

Figure 8:
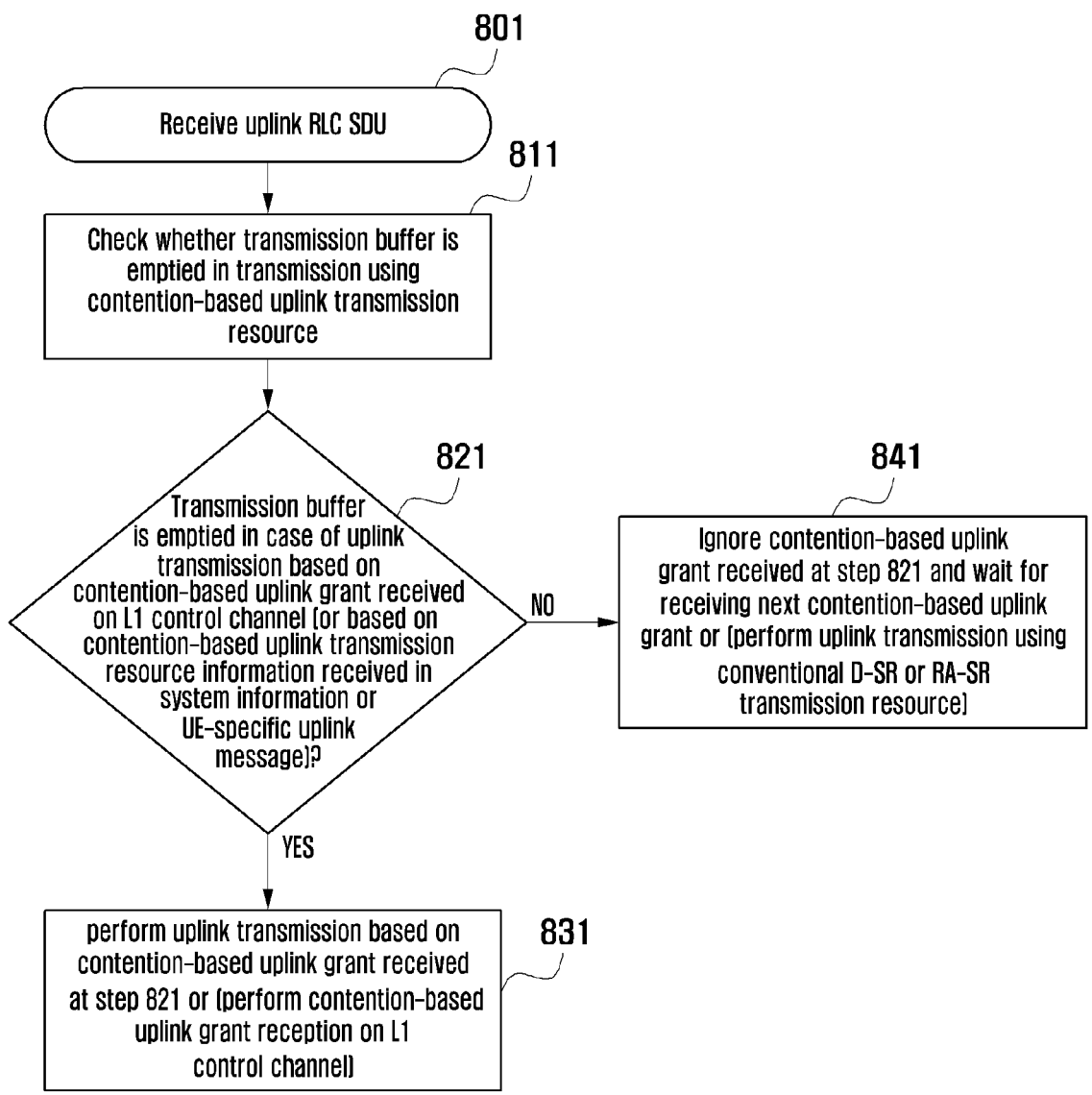
FIG. 8 is a flowchart illustrating the UE operation for the contention-based access procedure according to another embodiment of the present invention.

FIG. 8 is a flowchart illustrating the UE operation for the contention-based access procedure according to another embodiment of the present invention.

Referring to FIG. 8, an RLC PDU to be transmitted in uplink is generated at the higher layer (i.e., if the uplink data/control information occurs) at step 801, the UE checks whether the transmission buffer filled with data can be emptied by performing transmission using the contention-based uplink resource at step 811. If the transmission buffer can be emptied through the uplink transmission based on the contention-based uplink grant received on the L1 control channel, the UE performs uplink transmission based on the received contention-based uplink grant at step 821 and 831. Otherwise, if the transmission buffer cannot be emptied through the uplink transmission based on the contention-based uplink grant received on the L1 control channel, the UE ignores the received contention-based uplink grant and waits for receiving the next contention-based uplink grant or performs the uplink transmission using the conventional D-SR transmission resource or RA-SR transmission resource at step 821 and 841.

If the contention-based uplink transmission resource information is received in the system information or the UE-specific higher layer message, the UE checks whether the transmission buffer is emptied by the uplink transmission of the basis of the contention-based uplink transmission resource information and, if the transmission buffer is emptied, receives the contention-based uplink grant addressed to the CB-RNTI on the L1 control channel to perform the uplink transmission using the contention-based uplink transmission resource at step 821 and 831. Otherwise, if the transmission buffer is not emptied, the UE performs uplink transmission using the conventional D-SR or RA-SR transmission resource other than the convention-based uplink transmission resource at step 821 and 841. In this case, it is not necessary to receive the contention-based uplink grant addressed to the CB-RNTI on the L1 control channel.

The embodiments of FIGS. 6 to 8 may be applied limitedly to a specific logical channel. In this case, the information on the specific logical channel may be broadcast in the system information of the UE or transmitted in a UE-specific higher layer message or hardcoded as a standard value. In this case, if the uplink transmission RLC SDU is generated at the higher layer, the UE checks the logical channel on which the RLC SDU is delivered and, if the RLC SDU is delivered on the specific logical channel, performs the following operations and, otherwise, performs the uplink transmission using the conventional D-SR or RA-SR transmission resource.

Figure 9:
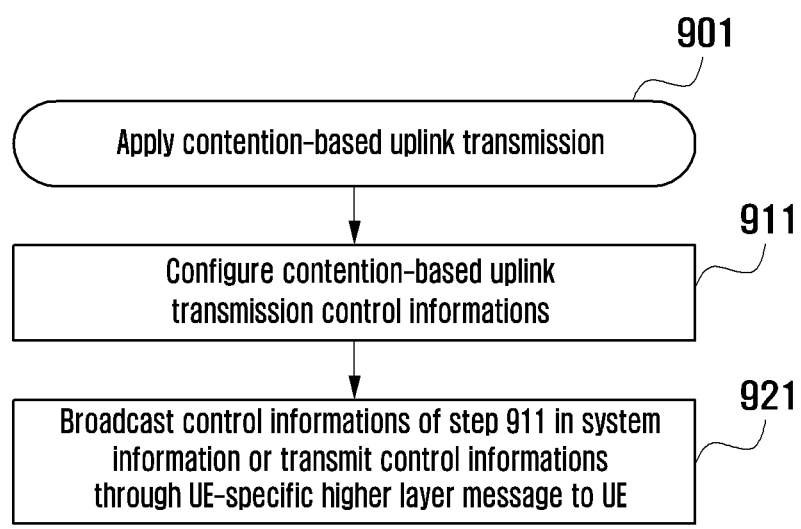
FIG. 9 is a flowchart illustrating the network operation for the contention-based access according to an embodiment of the present invention.

FIG. 9 is a flowchart illustrating the network operation for the contention-based access according to an embodiment of the present invention. Particularly, the description is directed to the operation of the eNB.

Referring to FIG. 9, if it is determined to apply the contention-based uplink transmission at step 901, the eNB configures the control information related to the contention-based uplink transmission at step 911. The contention-based uplink transmission control information includes the information about the condition to allow the contention-based access, and the condition information includes the RLC SDU size threshold value that can be applied in the contention-based uplink access (e.g. instruct to perform the contention-based uplink access only when the uplink transmission RLC SDU size is less than the size threshold value) and the indicator on whether to apply the operation for checking, if a contention-based uplink grant is received, whether to use the uplink grant (e.g. whether to perform the uplink transmission based on the contention-based uplink transmission grant only when the RLC SDU segmentation is not required in use of the received contention-based uplink grant or only when the transmission buffer is emptied in used of the received contention-based uplink grant). The condition information may also include the contention-based uplink transmission resource information and CB-RNTI value. The contention-based uplink transmission resources may be transmitted in the contention-based uplink grant addressed to the CB-RNTI on the L1 control channel or configures per cell semi-statically. The transmission resource information includes the number of Physical Resource Blocks, MCS level, coding rate, etc. The control informations configured at step 911 are broadcast as system information within the cell or transmitted to the UE in the form of UE-specific higher layer message at step 921. If the present invention is applied limitedly to a specific logical channel, the information on the specific logical channel is also configured at step 911 and transmitted at step 921.

Although FIG. 9 is directed to the case where the eNB signals the control information explicitly, if the control informations are hardcoded or the UE operations for the contention-based uplink transmission are performed always as specified in the standard without control of the eNB, it is not necessary for the eNB to transmit the control information explicitly.

Figure 10:
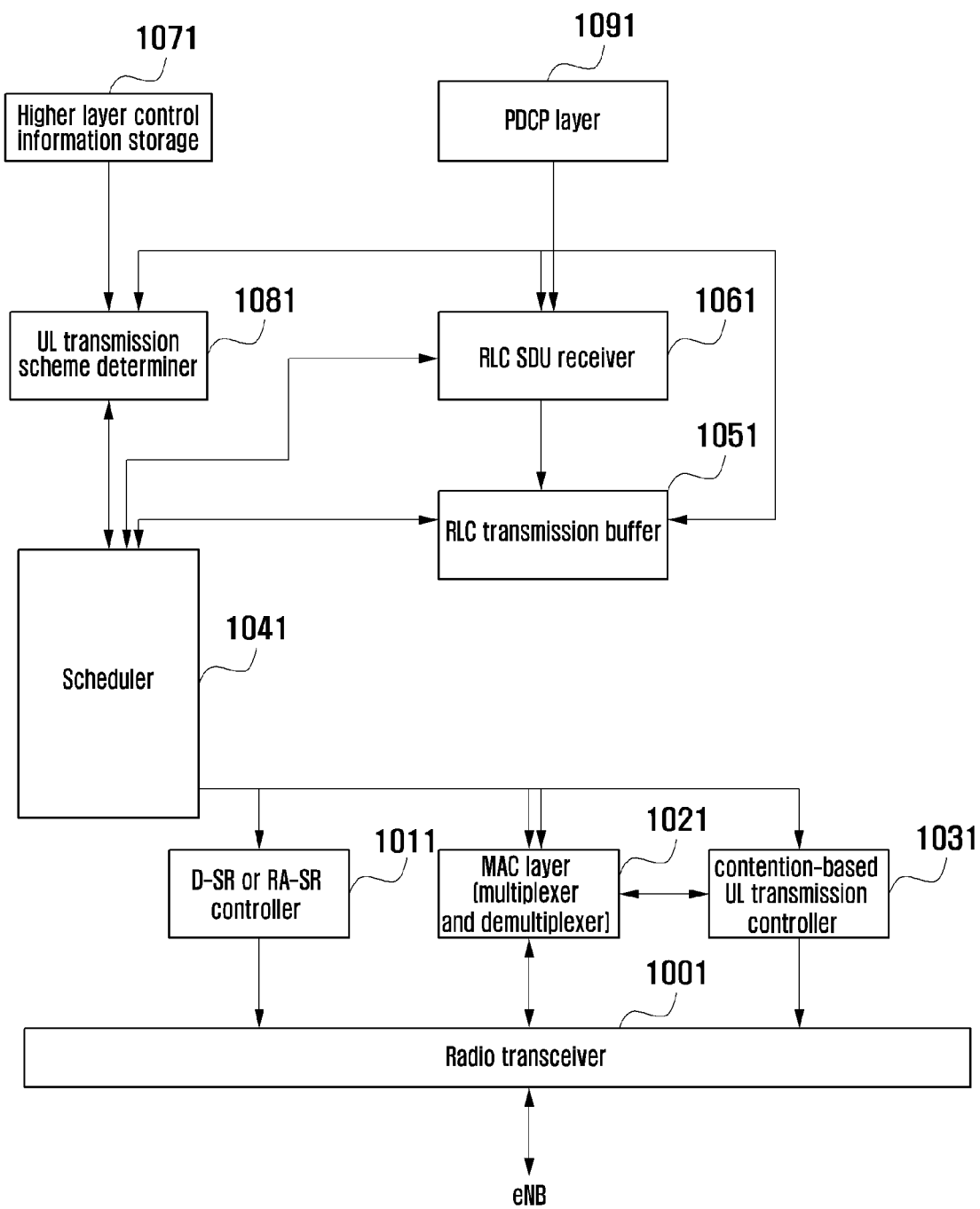
FIG. 10 is a block diagram illustrating a configuration of the UE according to an embodiment of the present invention.

FIG. 10 is a block diagram illustrating a configuration of the UE according to an embodiment of the present invention.

Referring to FIG. 10, the contention-based uplink transmission control informations received through the system information or the UE-specific higher layer message are managed in the higher layer control information storage 1071. If the RLC SDU receiver 1061 receives the RLC SDU generated by the PDCP layer 1091, the uplink transmission scheme determiner 1081 checks the RLC SDU size based on the contention-based uplink transmission control informations to determine the uplink transmission scheme, i.e. whether to perform the uplink transmission using the conventional D-SR or RA-SR transmission resource or the contention-based uplink transmission resource. According to another embodiment, in the case of assuming the uplink transmission based on the uplink transmission control information stored in the higher layer control information storage 1071 or the contention-based uplink grant received by the scheduler 1041 through the radio transceiver 1001, the uplink transmission method determiner 1081 checks whether the RLC SDU receiver 1061 has to segment the RLC SDU and determines whether to perform the contention-based uplink transmission based on the checking result. According to still another embodiment of the present invention, in the case of assuming the uplink transmission based on the uplink transmission control information stored in the higher layer control information storage 1071 or the contention-based uplink grant received by the scheduler 1041 through the radio transceiver 1001, the uplink transmission scheme determiner 1081 checks whether the RLC transmission buffer 1051 is emptied through the contention-based uplink transmission and determines whether perform the contention based uplink transmission based on the checking result.

The MAC layer 1021 performs uplink transmission using the conventional D-SR or RA-SR transmission resource under the control of the D-SR or RA-SR controller 1011 as scheduled by the scheduler 1041 or using the contention-based uplink grant indicated by the CB-RNTI under the control of the contention-based uplink transmission controller 1031.

If uplink data is generated by the PDCP layer 1091, the uplink transmission determiner 1081 determines whether to use the contention-based uplink grant received from the eNB depending on the size of the uplink data. If it is determined to use the contention-based uplink grant, the contention-based uplink transmission controller 1031 controls uplink data transmission to the eNB on the contention-based uplink transmission resource indicated in the contention-based uplink grant.

At this time, the uplink transmission scheme determiner 108 compares the uplink data size with a predetermined threshold to determine whether to use the contention-based uplink grant. Here, if the uplink data size is equal to or less than the threshold value, the uplink transmission scheme determiner 1081 determines to use the contention-based uplink grant. Otherwise, if the uplink data size is greater than the threshold value, the uplink transmission scheme determiner 1081 determines to ignore the contention-based uplink grant.

Meanwhile, the uplink transmission scheme determiner 1081 is capable of checking whether it is required to segment the uplink data in use of the contention-based uplink transmission resource indicated by the contention-based uplink grant to determine whether to use the contention-based uplink grant. Here, if it is not required to segment the uplink data, the uplink transmission scheme determiner 1081 determines to use the contention-based uplink grant. Otherwise, if it is required to segment the uplink data, the uplink transmission scheme determiner determines to ignore the contention-based uplink grant.

The uplink transmission scheme determiner 1081 is also capable of checking whether the RLC transmission buffer 105s is to be emptied according to the uplink data transmission through the contention-based uplink transmission resource indicated by the contention-based uplink grant to determine whether to use the contention-based uplink grant. Here, if the RLC transmission buffer 1051 is to be emptied, the uplink transmission scheme determiner 1081 determines to use the contention-based uplink grant. Otherwise, if the RLC transmission buffer is not to be emptied, the uplink transmission scheme determiner 1081 determines to ignore the contention-based uplink grant.

Figure 11:
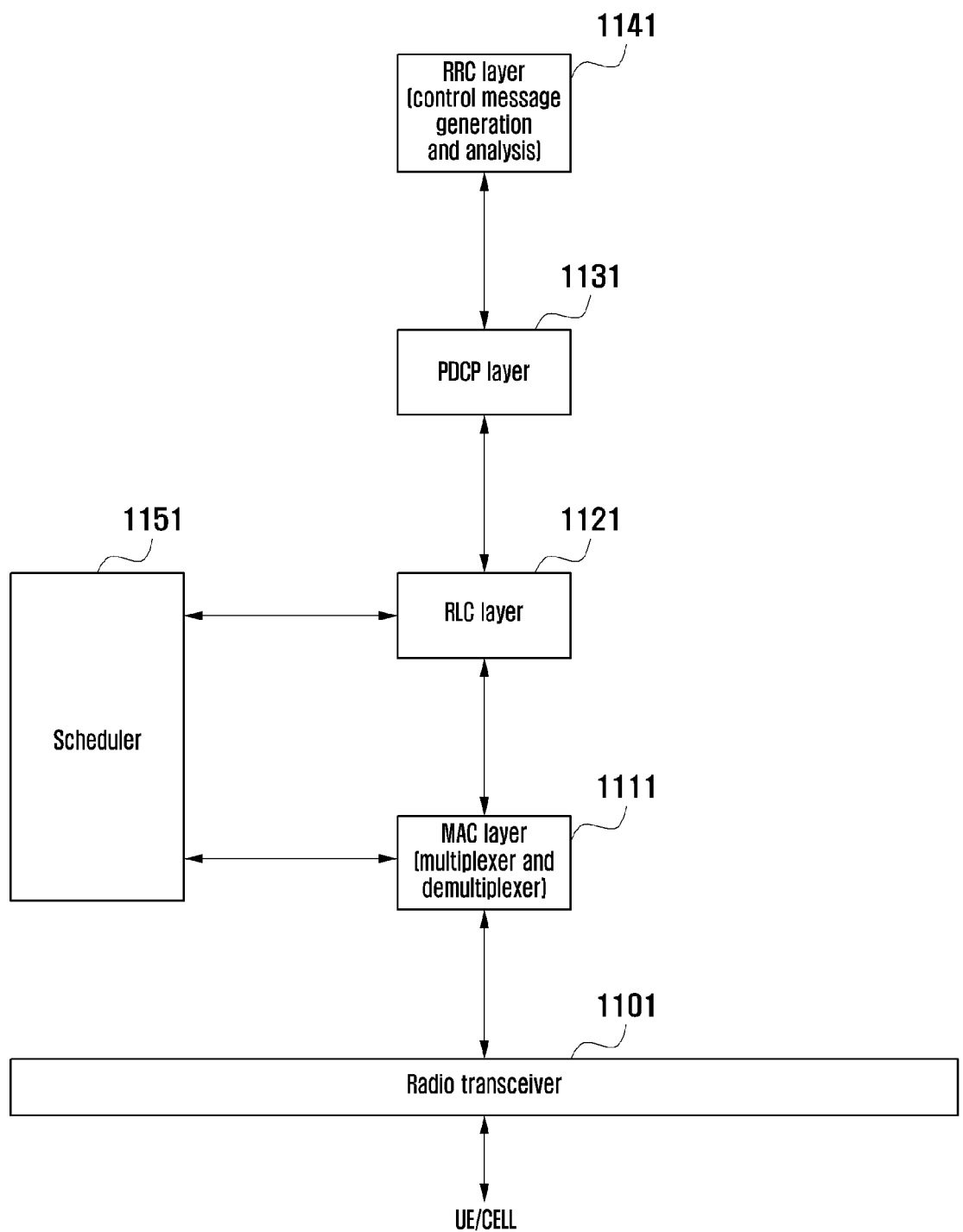
FIG. 11 is a block diagram illustrating the configuration of a network according to an embodiment of the present invention.

FIG. 11 is a block diagram illustrating the configuration of a network according to an embodiment of the present invention.

Referring to FIG. 11, if the control message including the contention-based uplink transmission control information is generated at the RRC (Radio Resource Control) layer 1141, the message is delivered to the radio transmitter 1131 through the PDCP layer 1131, the RLC layer 1121, and the MAC layer 1111 so as to be transmitted to the UE. The scheduler 1151 allocates the contention-based uplink transmission resource such that the contention-based uplink grant addressed to the CB-RNTI is transmitted on the L1 control channel at corresponding timing.

That is the scheduler 1151 determines the contention-based uplink transmission resource. The radio transceiver 1151 transmits the contention-based uplink grant indicating the contention-based uplink transmission resource to the UE. The radio transceiver 1101 also receives the uplink data transmitted by the UE through the contention-based uplink transmission resource.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A contention-based uplink transmission method of a user equipment (UE) in a mobile communication system, the method comprising:
receiving information associated with access control on higher layer signaling, from a base station;
determining whether to perform a contention-based uplink transmission based on a condition indicator included in the information associated with access control;
receiving an uplink grant from the base station, the uplink grant including information on a contention-based uplink resource for the contention-based uplink transmission;
determining whether the condition indicator applies to a specific logical channel on which the uplink transmission is to be performed, the determination based on logical channel information in the received information;
determining whether uplink data needs to be segmented when the uplink data is to be transmitted on the contention based uplink resource if the condition indicator indicates that an uplink data segmentation condition is used; and
transmitting the uplink data using the contention-based uplink resource based on the determination of segmentation of the uplink data and the determination of whether the condition indicator applies to the specific logical channel,
wherein the information on the contention-based uplink resource comprises at least one of a number of physical resource blocks, modulation and coding scheme level information, or coding rate information.

2. The method of claim 1, wherein the transmitting comprises:
transmitting, if the uplink data using the contention-based uplink resource does not need to be segmented, the uplink data using the contention-based uplink resource; and
skipping a transmission of the uplink data using the contention-based uplink resource, if the uplink data using the contention-based uplink resource needs to be segmented.

3. The method of claim 1, wherein the uplink grant is indicated by a contention-based-radio network temporary identifier (CB-RNTI).

4. A contention-based uplink reception method of a base station in a mobile communication system, the method comprising:
transmitting information associated with access control on higher layer signaling, to a user equipment (UE), the information including logical channel information indicating a logical channel to which a condition indicator applies;
transmitting an uplink grant to the UE, the uplink grant including information on a contention-based uplink resource for the contention-based uplink transmission; and
receiving uplink data using the contention-based uplink resource based on a determination of whether the uplink data is need to be segmented, the condition indicator included in the information associated with access control if the condition indictor indicates that an uplink data segmentation condition is used, and a determination of whether the logical channel information indicates that the condition indicator applies to a specific logical channel on which the uplink data is received,
wherein the information on the contention-based uplink resource comprises at least one of a number of physical resource blocks, modulation and coding scheme level information, or coding rate information.

5. The method of claim 4, wherein the uplink grant is indicated by a contention-based-radio network temporary identifier (CB-RNTI).

6. A user equipment (UE) apparatus for a contention-based uplink transmission in a mobile communication system, the apparatus comprising:
a transceiver configured to transmit and receive signals to and from a base station; and
a processor configured to:
receive information associated with access control on higher layer signaling, from a base station,
determine whether to perform a contention-based uplink transmission based on a condition indicator included in the information associated with access control,
receive an uplink grant from the base station, the uplink grant including information on a contention-based uplink resource for the contention-based uplink transmission,
determine whether the condition indicator applies to a specific logical channel on which the uplink transmission is to be performed, the determination based on logical channel information in the received information,
determine whether uplink data needs to be segmented when the uplink data is to be transmitted on the contention based uplink resource if the condition indicator indicates that an uplink data segmentation condition is used, and
transmit the uplink data using the contention-based uplink resource based on the determination of segmentation of the uplink data and the determination of whether the condition indicator applies to the specific logical channel,
wherein the information on the contention-based uplink resource comprises at least one of a number of physical resource blocks, modulation and coding scheme level information, or coding rate information.

7. The apparatus of claim 6, wherein the at least one processor is further configured to:
transmit, if the uplink data using the contention-based uplink resource does not need to be segmented, the uplink data using the contention-based uplink resource, and
skip a transmission of the uplink data using the contention-based uplink resource, if the uplink data using the contention-based uplink resource needs to be segmented.

8. The apparatus of claim 6, wherein the uplink grant is indicated by a contention-based-radio network temporary identifier (CB-RNTI).

9. A base station for a contention-based uplink reception in a mobile communication system, the base station comprising:
a transceiver configured to transmit and receive signals to and from a user equipment (UE); and
a processor configured to:
transmit information associated with access control on higher layer signaling, to the UE, the information including logical channel information indicating a logical channel to which a condition indicator applies, transmit an uplink grant to the UE, the uplink grant including information on a contention-based uplink resource for the contention-based uplink transmission, and receive uplink data using the contention-based uplink resource based on a determination of whether the uplink data is need to be segmented and the condition indicator included in the information associated with access control if the condition indictor indicates that an uplink data segmentation condition is used, and a determination of whether the logical channel information indicates that the condition indicator applies to a specific logical channel on which the uplink data is received, wherein the information on the contention-based uplink resource comprises at least one of a number of physical resource blocks, modulation and coding scheme level information, or coding rate information.

10. The base station of claim 9, wherein the uplink grant is indicated by a contention-based-radio network temporary identifier (CB-RNTI).

* * * * *